United States Patent [19]
Cocron et al.

[11] 4,268,137
[45] May 19, 1981

[54] RADIATION-EMISSIVE FOCUSSING SYSTEM WITH INTEGRATION OF THE SIGNALS PRODUCED BY THE SYSTEM'S DETECTOR ARRANGEMENT

[75] Inventors: Istvan Cocron; Theodor Huber; Wolfgang Ruf, all of Munich, Fed. Rep. of Germany

[73] Assignee: AGFA-Gevaert, A.G., Leverkusen, Fed. Rep. of Germany

[21] Appl. No.: 28,186

[22] Filed: Apr. 9, 1979

[30] Foreign Application Priority Data
Apr. 7, 1978 [DE] Fed. Rep. of Germany ....... 2815150

[51] Int. Cl.³ .......................... G03B 13/18; G01J 1/36
[52] U.S. Cl. ................... 354/23 D; 354/25; 354/31; 250/204
[58] Field of Search ................. 354/25, 31, 23 D, 162, 354/163, 165, 60 L, 198; 352/140; 356/1, 4; 250/201, 204, 210; 328/116, 147, 151

[56] References Cited
U.S. PATENT DOCUMENTS

| | | | |
|---|---|---|---|
| 3,652,160 | 3/1972 | Odone et al. | 354/163 X |
| 3,813,679 | 5/1974 | Hasegawa et al. | 354/25 X |
| 3,836,919 | 9/1974 | Matsumoto et al. | 354/25 |
| 3,988,747 | 10/1976 | Lermann et al. | 354/25 |
| 4,178,098 | 12/1974 | Asano et al. | 354/25 X |

*Primary Examiner*—L. T. Hix
*Assistant Examiner*—William B. Perkey
*Attorney, Agent, or Firm*—Michael J. Striker

[57] ABSTRACT

Pulses of radiation are emitted from the camera to the subject, reflected back to the camera, and incident upon two detectors. The successive pulses produced by the two detectors are applied to respective integrators which trip respective threshold circuits when and if their integral signals reach the threshold value. This inherently reduces detector and other noise present in the processing circuitry. A tolerance-range counter ascertains whether or not, after one threshold circuit is tripped, the other becomes tripped within a predetermined time interval.

19 Claims, 2 Drawing Figures

Fig.1

Fig.2

RADIATION-EMISSIVE FOCUSSING SYSTEM WITH INTEGRATION OF THE SIGNALS PRODUCED BY THE SYSTEM'S DETECTOR ARRANGEMENT

BACKGROUND OF THE INVENTION

The present invention concerns still or motion-picture camera focussing systems of the type which emit radiation from the camera to the subject, and receive the reflected-back radiation. The focussing system's detector arrangement produces signals from which are ultimately derived focus-control data, used to drive an indicator which informs the user of the direction in which he should change the camera's present subject-distance setting, or else controlling the energization of an adjusting motor operative for automatically correcting the camera's state of focus.

With radiation-emissive focussing systems, it can easily happen that when the camera-to-subject distance is great, and/or the reflecting characteristics of the subject are low, the power of the reflected-back radiation incident upon the system's detector arrangement is too low to yield signals fit for processing and for the generation of focus-control data. Of course, this problem can be overcome by employing sufficiently high emitted-power levels, but this tends to increase the cost of the system and its energy consumption. The lower limit of the emitted-power level which can be employed is typically dictated by the noise level associated with the particular transducer design used for the detector arrangement and also by the noise present in the circuitry which processes the detector's output signals.

SUMMARY OF THE INVENTION

It is a general object of the invention to provide a focussing system of the type in question which permits lower power levels to be employed by reducing the influence of detector and other noise present in the system.

In the preferred embodiment of the invention, signals are derived from first and second detector elements in the form of pulses of predetermined frequency and pulse-duration/interpulse-duration ratio and having A.C. voltage character and mixed with a noise of A.C. voltage character. These signals are applied to an integrating stage, preferably through signal-transmitting means enabled only during time intervals substantially concurrent with these pulses, to yield time-integral signals in which the effect of the noise is inherently reduced. The time-integral signals are applied to a threshold stage whose threshold voltage is large compared to the A.C. noise voltage, the time required for the integral signal to reach the threshold level, e.g., as expressed in the number of pulses integrated, being dependent upon the amplitudes and pulse-duration/interpulse-duration of the pulses. The integrating stage is periodically reset, in order to develop a new integral signal, during which the output signal, if any, produced by the threshold stage is stored by a signal-storage stage, so as to be available to the state-of-focus evaluating circuitry of the system during the development of the next integral signal. Because the integration of the high-frequency A.C. noise component is performed over a time interval which is equal to or greater than the wavelengths of the A.C. noise component, these are very considerably cancelled out in the process of integration, leaving mainly only a relatively low D.C. noise component. The actual A.C. signal component is preferably integrated during a time interval short enough relative to its wavelength as to assure that the information of interest within it not be lost in the process of integration. No detector signal can reach the system's evaluating circuit unless the threshold level of the threshold stage is exceeded. In the case of weak signals, a greater number of pulses must be integrated before this is achieved; in the case of strong signals, a lower number of pulse integrations results in tripping of the threshold stage. Employing this simple technique, loss of sensitivity is prevented and the resolution of the system can be increased. No particular modifications of the transmitting and receiving circuitry of the system are needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
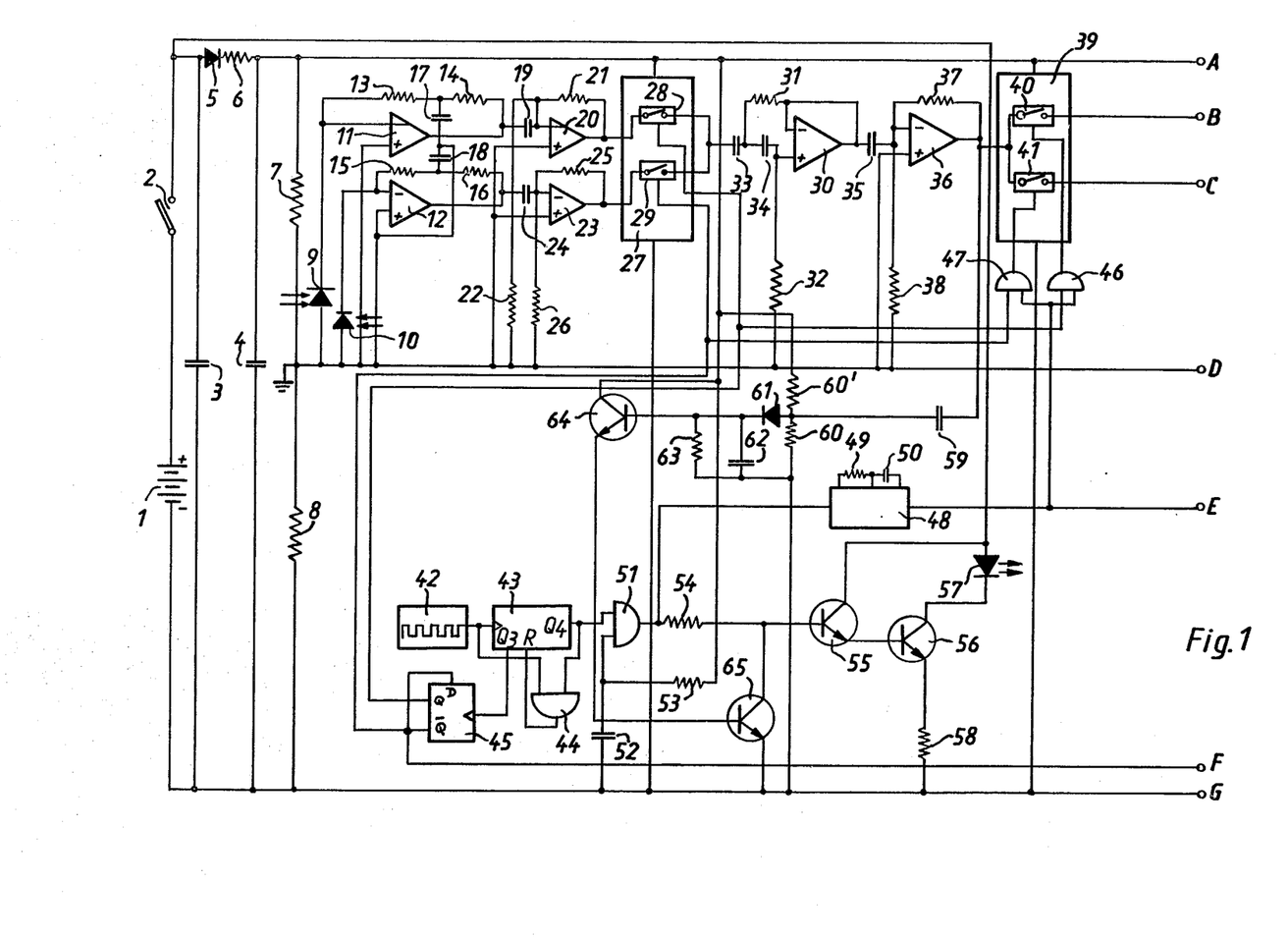
FIGS. 1 and 2 are the left and right halves of a circuit diagram depicting an exemplary and preferred embodiment of the invention.

In FIG. 1, numeral 1 denotes a battery connectable via a power-connect switch 2 to the remainder of the illustrated circuitry. Two capacitors 3, 4, a diode 5 and a resistor 6, together serve to derive from the battery voltage a stabilized operating voltage furnished on line A. Two equal-value resistors 7, 8 connected across the operating voltage establish a midway ground potential for parts of the illustrated circuitry. An infrared-responsive receiver system includes two infrared-responsive diodes 9, 10. In a manner described, for example, in commonly owned copending application Ser. No. 5,091, filed Jan. 22, 1979, now U.S. Pat. No. 4,221,474, the entire disclosure of which is incorporated herein by reference, the two photodiodes 9, 10 are located side by side in the path of an infrared-light beam reflected back towards the camera from a subject towards which an infrared beam is emitted by the camera's focussing system; if the camera's state of focus is correct, the reflected back beam is incident on the two photodiodes equally, if too short then incident more or exclusively on one photodiode, if too long then incident more or exclusively on the other photodiode. Infrared photodiode 9 is connected to the inverting input of an operational amplifier 11, whose non-inverting input is connected to ground. Photodiode 10 is connected to the inverting input of an operational amplifier 12, whose non-inverting input is connected to ground.

The feedback branch of each operational amplifier 11 or 12 comprises two resistors 13, 14 or 15, 16, serving to establish the D.C. signal component gain of the amplifiers. The taps between resistors 13 and 14, and 15 and 16, are connected to ground via respective capacitors 17 and 18. As a result, the A.C. signal component gain of the amplifiers is made frequency-dependent, increasing with increasing frequency. The resistors 13 and 14 are preferably equal in value to resistors 15 and 16; the same applies to the two capacitors 17 and 18.

The illustrated system has two signal transmission paths, the first associated with photodiode 9, the second with photodiode 10. The first signal transmission path comprises a coupling capacitor 19 connecting the output of operational amplifier 11 to the inverting input of an operational amplifier 20, in whose feedback branch is connected a resistor 21 which together with a resistor 22 sets the gain of amplifier 20. Operational amplifier 20 operates as an A.C. voltage amplifier. The second signal transmission path likewise comprises a coupling capacitor 24 connecting the output of operational amplifier 12 to the inverting input of an operational amplifier 23, whose feedback branch comprises a resistor 25 which together with a resistor 26 sets the gain of amplifier 23; amplifier 23, likewise, operates as an A.C. voltage amplifier.

Both signal transmission paths feed into a first multiplexer 27, comprised of two switching stages 28 and 29. Multiplexer 27 has two outputs connected in common to a high-pass filter comprised of an operational amplifier 30, resistors 31, 32 and capacitors 33, 34. High-pass filter 30–34 is designed to suppress interference voltages having frequencies equal to or twice the local mains frequency, in order that the system not be responsive to artificial lighting sources flickering at or at twice the local mains frequency.

High-pass filter 30–34 is connected via a coupling capacitor 35 to an A.C. voltage amplifier comprised of an operational amplifier 36 with gain-establishing resistors 37 and 38.

A second multiplexer acting as a demultiplexer 39 comprises two switching stages 40, 41 whose inputs are connected in common to the output of A.C. voltage amplifier 36–38. The outputs of the two switching stages 40, 41 are connected to respective terminals B and C.

A pulse generator 42 is connected to the counting input of a counter 43 operative as a timer for the illustrated circuitry. The output of pulse generator 42 and an output Q4 of counter 43 are connected to respective inputs of an AND-gate 44, whose output is connected to the reset input R of counter 43. An output Q3 of counter 43 is connected to the clock input of a D-flip-flop 45, whose D-input is connected to its own $\bar{Q}$ output.

The Q-output of flip-flop 45 is connected to the control input of the switching stage 28 within first multiplexer 27 and also to left input of an AND-gate 46. The $\bar{Q}$-output of flip-flop 45 is connected to the control input of switching stage 29 of first multiplexer 27 and also to the left input of an AND-gate 47. The right inputs of the two AND-gates 46, 47 are connected in common to the output of an adjustable time-delay stage 48–50, whose time-constant-determining resistor 49 and capacitor 50 are shown externally connected. The input of time-delay stage 48–50 is connected to the output of an AND-gate 51, whose upper input is connected to output Q4 of counter 43, and whose lower input is connected to the output of a time-delay stage comprised of a capacitor 52 and a resistor 53. The output of AND-gate 51 is furthermore connected via a resistor 54 to the base of a transistor 55 whose emitter is connected to the base of a further transistor 56, the collector circuits of the two transistors 55, 56 containing an infrared-emissive transmitter diode 57, operative when subjected to pulsed energization for emitting a pulsed infrared beam from the focussing system towards the subject, for reflection from the subject back onto the photodetector arrangement 9, 10. Numeral 58 denotes the emitter resistor of transistor 56.

The output of AND-gate 46 is connected to the control input of the switching stage 40 within second multiplexer 39, and the output of AND-gate 47 to the control input of switching stage 41.

The power of the infrared energy incident upon photodetector arrangement 9, 10 is automatically regulated in the illustrated embodiment by automatic adjustment of the level of energization of infrared transmitter diode 57. In particular, the output of A.C. voltage amplifier 36, at which appears a signal whose amplitude is inherently dependent upon the camera-to-subject distance, is connected via a capacitor 59 to the tap of a voltage divider 60, 60' connected across the operating voltage line A. Connected to the tap of voltage divider 60, 60' is a charging diode 61 which charges a capacitor 62 across which is connected a bleedoff resistor 63. Capacitor 62 is connected to the base of a transistor 64 whose collector is connected to operating voltage line A and whose emitter is connected to the base of a further transistor 65. The collector of transistor 65 is connected to the base of transistor 55. Infrared-emissive diode 57 is energized when a "1" signal appears at the output of AND-gate 51, the resistor 54 and the controllable collector-emitter resistance of transistor 65 being connected across the output of AND-gate 51 and acting as a voltage divider whose tap is connected to the base of transistor 55. When the camera-to-subject distance is low, the amplitude of the signal produced at the output of A.C. voltage amplifier 36 is high, capacitor 62 charges to a relatively high voltage, increasing the emitter current of transistor 64, thereby decreasing the collector-emitter resistance of transistor 65, thereby lowering the fraction of the output voltage of AND-gate 51 actually applied to the base of transistor 55, as a result of which the energizing current flowing through infrared-emissive diode 57 tends to decrease. Conversely, if the camera-to-subject distance is long, the energizing current flowing through infrared-emissive diode 57 assumes a higher value. Accordingly, the power level of the signals produced by the photodetector arrangement 9, 10 is negative-feedback regulated, by automatic control of the level of radiant power emitted by from transmitter diode 57. For longer camera-to-subject distances, higher radiant power is emitted, and for shorter distances lower power. This negative-feedback regulation of the received-back radiant power can be such that the level of radiant power emitted varies inversely to true camera-to-subject distance throughout the entire range of distances in which the focussing system is to be operated; this is implemented by designing the negative-feedback regulating stage such that the collector-emitter resistance of transistor 65 varies within its operative range for the range of photodiode-signal amplitude levels associated with the system's operative range of distances. Alternatively, the negative-feedback regulation can be so designed as to mainly effect a more or less abrupt cut-down or limiting of emitted radiant power for close-up contexts, by designing the regulator such that transistor 65 begins to lower the energization level of transmitting diode 57 only when the signal derived from photodetector arrangement 9, 10 begins to exhibit high values associated with short camera-to-subject distances.

The output of second-multiplexer switching stage 40 is connected via terminal B to a first integrator (see FIG. 2) comprised of an operational amplifier 66 provided with an integrating capacitor 67 in its negative-feedback branch and an input resistor 68. The output of integrator 66–68 is connected to the input of a voltage comparator comprised of an operational amplifier 69 whose non-inverting input is connected to the tap of a voltage divider 70, 71 connected between operating voltage line A and ground line D. Numeral 72 denotes a load resistor. The collector of a transistor 73 is connected to the output of integrator 66–68 and its emitter to ground line D; when transistor 73 is rendered conductive, it serves to discharge integrating capacitor 67 and thereby reset integrator 66–68.

Figure 2:
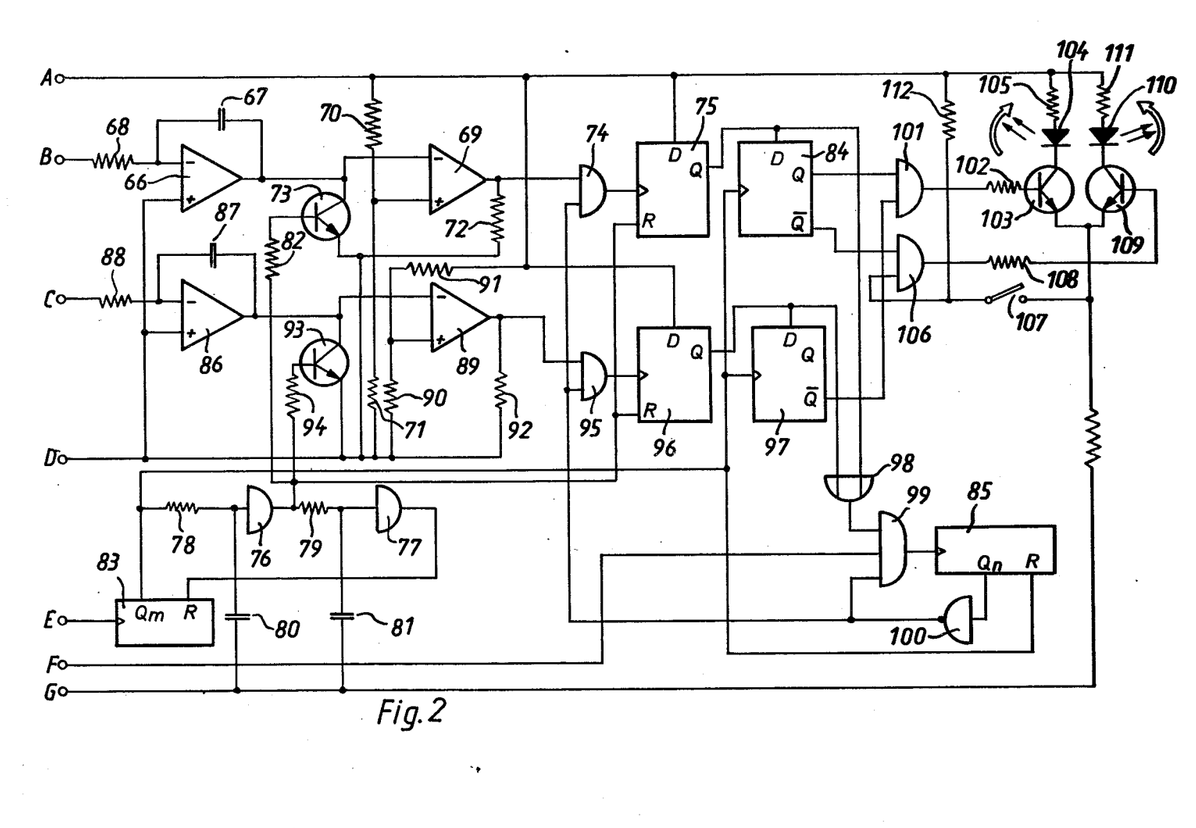

The output of voltage comparator 69–72 is connected to the upper input of an AND-gate 74. The output of AND-gate 74 is connected to the clock input of a D flip-flop 75 whose D-input is connected to the operating voltage line A. The reset input R of D-flip-flop 75 is connected to an intermediate point of a time-delay chain comprised of gates 76, 77, resistors 78, 79 and capacitors 80 and 81. The base of transistor 73 is connected via a resistor 82 to the same intermediate point of time-delay chain 76–81, namely to the output of gate 76. The input of time-delay chain 76–81 is connected to the output Qm of a cycle counter 83 whose reset input R is connected to the output of the time-delay chain. The counting input of counter 83 is connected via a terminal E to the output of adjustable time-delay stage 48–50.

The output Qm of cycle counter 83 is connected to the clock input of a D-flip-flop 84 whose D-input is connected to the Q-output of D-flip-flop 75.

Additionally, the output Qm of cycle counter 83 is connected to the reset input R of a tolerance-range counter 85, discussed in detail below.

The output of switching stage 41 of second multiplexer 39 is connected via a terminal C to a second integrator comprised of an operational amplifier 86, an integrating capacitor 87 and a resistor 88, resistor 88 being connected to the inverting input of the operational amplifier, and the non-inverting input being connected to ground line D. The two integrators 66–68 and 86–88 are preferably as nearly identical as possible. The output of second integrator 86–88 is connected to a second voltage comparator comprised of an operational amplifier 89, a voltage divider 90, 91 and a load resistor 92. Second voltage comparator 89–92 has the same threshold voltage value as first voltage comparator 69–72. Voltage divider 90, 91, like 70, 71 is connected between operating voltage line A and ground line D, with its tap connected to the non-inverting input of its respective operational amplifier 89. The output of operational amplifier 86 is connected to the collector of a transistor 93 whose emitter is connected to ground line D; when transistor 93 is rendered conductive, this serves to discharge integrating capacitor 87 and thereby reset second integrator 86–88. The base of transistor 93 is connected via a resistor 94 to the output of gate 76 of time-delay chain 76–81.

The output of operational amplifier 89 is connected to the upper input of an AND-gate 95, whose output is connected to the clock input of a D-flip-flop 96, the reset input R of which is connected to the intermediate point of time-delay chain 76–81. The Q-output of D-flip-flop 96 is connected to the D-input of a further D-flip-flop 97 whose clock input is connected to output Qm of cycle counter 83. The Q-outputs of flip-flops 75 and 96 are additionally connected to respective inputs of an OR-gate 98, whose output is connected to the upper input of an AND-gate 99. The middle input of AND-gate 99 is connected via a terminal F to the $\overline{Q}$ output of D-flip-flop 45 (FIG. 1). The lower input of AND-gate 99 is connected to the output of an inverter 100 whose input is connected to the output Qn of tolerance-range counter 85. The output of inverter 100 is additionally connected to the lower input of the two AND-gates 74, 95, already mentioned.

The Q-output of flip-flop 84 is connected to the upper input of an AND-gate 101, whose lower input is connected to the $\overline{Q}$-output of flip-flop 97. The output of AND-gate 101 is connected via a resistor 102 to the base of a transistor 103 in whose collector circuit is connected a light-emitting diode 104 and a resistor 105. LED 104 light up to indicate to the user that he should manually turn the camera's focus adjuster ring in a first direction.

The $\overline{Q}$-output of flip-flop 84 is connected to the upper input of an AND-gate 106, whose lower input is connectable via a switch 107 to the negative terminal of battery 1. When switch 107 is open, the lower input of AND-gate 106 is connected via a resistor 112 to the operating voltage line A. The output of AND-gate 106 is connected via a resistor 108 to the base of a transistor 109 in whose collector circuit is connected a light-emitting diode 110 and a resistor 111. LED 110 lights up to indicate to the user that he is to turn the camera's focus adjuster ring in the other direction.

The illustrated circuitry operates as follows:

When power-connect switch is closed, a time delay established by time-delay stage 52, 53 elapses before an enabling "1" signal is applied to the lower input of AND-gate 51. This precludes energization of infrared-emissive diode 57, until after the elapse of a warm-up interval sufficient for pulse generator 42 to reach and stabilize at its designed frequency.

After AND-gate 51 has thusly become enabled, it produces an output "1" signal, resulting in energization of transmitter diode 57, once per counting cycle of counter 43. In response to predetermined numbers of pulses received from pulse generator 42, counter 43 produces a "1" signal on its output Q3 and thereafter a "1" signal on its output Q4, in response to which latter the "1" signal is produced at the output of AND-gate 51. After one such cycle of operation counter 43 resets.

During one operating cycle of counter 43, the "1" signal produced at its output Q3 causes a "1" signal to appear at the Q-output of D-flip-flop 45; during the next operating cycle of counter 43, the "1" signal produced at output Q3 causes such "1" signal to skip over to the $\overline{Q}$-output of flip-flop 45; and so forth, proceeding in alternation. As a result, during one cycle of operation of counter 43, first-multiplexer switching stage 28 and second-multiplexer switching stage 40 are rendered conductive, for transmission of the signal from infrared-responsive photodiode 9 through the first signal transmission path, including the signal-processing stages 30–38 shared by both signal transmission paths, to the first integrator 66–68. During the next cycle of operation of counter 43, first-multiplexer switching stage 29 and second-multiplexer switching stage 41 are rendered conductive, for transmission of the signal from photodiode 10 through the second signal transmission path, including shared signal-processing stages 30–38, to second integrator 86–88. And so forth, the transmission of the signals from first and second photodiode 9, 10 occurring alternately, during alternate respective cycles of operation of counter 43.

As explained in detail in the commonly owned copending application identified earlier, if the camera's present subject-distance setting is exactly correct, the reflected-back infrared radiation incident on photodetector arrangement 9, 10 is incident on both photodiodes 9 and 10 equally; if the present subject-distance setting is shorter than the true subject distance, the reflected-back beam is incident more on or exclusively on one of the two photodiodes 9, 10, depending upon the extent to which the present setting is too short; if the present subject-distance setting is longer than the true subject distance, the reflected-back beam is incident more on or exclusively on the other of the two photodiodes 9, 10, depending upon the extent to which the present setting is too long.

During one cycle of operation, the first integrator 66-68 integrates the processed signal derived from first photodiode 9, along with noise unavoidably present in the signal furnished by the photodiode per se and in the first signal transmission path in general. This integration continues for as long as the first switching stage 40 of second multiplexer 39 remains conductive. Advantageously, switching stage 40 is rendered conductive somewhat after the first switching stage 28 of first multiplexer 27, in order to allow the signal-processing circuitry to fully react to the signal it is to process before transmission by second-multiplexer switching stage 40; and likewise is rendered non-conductive before corresponding first-multiplexer switching stage 28 is rendered non-conductive. Upon termination of this integration, the integral signal thus far developed at the output of first integrator 66-68 is persistently held.

Then, during the next cycle of operation of counter 43, the processed signal from the second photodiode 10 is integrated by second integrator 86-88 and, at the end of this integration, the integral signal developed at the output of second integrator 86-88 is likewise persistently held.

During the next-following cycle of operation of counter 43, the processed signal derived from first photodiode 9 is again applied to first integrator 66-68, and thus integration of the signal derived from first photodiode 9 continues.

And so forth.

In this way, the first and second integral signals developed at the outputs of first and second integrators 66-68 and 86-88 build up stepwise, of course having magnitudes dependent upon the intensity of infrared radiation incident upon their respective photodiodes 9 and 10. Subjecting the processed signals derived from the two photodiodes 9, 10 to integration very considerably improves the signal-to-noise ratio of the signals thusly obtained, i.e., yields light-dependent integral signals which are much more exclusively dependent upon the information of actual interest, and much less dependent upon photodiode and other noise, than are the signals produced at the two outputs of second multiplexer 39.

The integral signal at the output of one or the other or both of the first and second integrators 66-68, 86-88 thus builds up stepwise, increasing by one step during each alternate operating cycle of counter 43, and the number of integrations performed by the integrator before its output signal reaches the threshold voltage level of its associated voltage comparator 69-72 or 89-92 will depend upon the amplitude of the processed photodiode signal being integrated.

Assuming, for explanatory purposes, that the threshold level of first voltage comparator 69-72 is reached first, a "1" signal is applied to the upper input of associated AND-gate 74. In general, a "1" signal is present at the lower inputs of the two AND-gates 74, 95, applied thereto from the output of inverter 100, because the signal at output Qn of tolerance-range counter 85 will in general be a "0", i.e., except at those times when tolerance-range counter 85 has begun to count and has furthermore reached a predetermined count at which a "1" signal appears at its output Qn. Accordingly, the "1" signal applied by first voltage comparator 69-72 to the upper input of AND-gate 74 produces a "1" signal at the output of that gate, which in turn is transmitted to the clock input of associated D-flip-flop 75, as a result of which flip-flop 75 becomes set, i.e., a "1" signal appears at its Q-output. This "1" signal is transmitted to the associated input of OR-gate 98, producing a "1" signal at the output of gate 98 and thereby at the upper input of AND-gate 99. The lower input of AND-gate 99 will be in receipt of a "1" signal because, as already indicated, a "1" signal will in general be present on the output of inverter 100. The first "1" signal to be produced at the output of AND-gate 99 is produced as soon as a "1" signal is received at its middle input, via terminal F, from the $\bar{Q}$-output of D-flip-flop 45. As already explained, a "1" signal appears at the $\bar{Q}$-output of D-flip-flop 45 during every alternate counting cycle of counter 43, in particular during those counting cycles of counter 43 in which the signal transmission path from second photodiode 10 is rendered conductive. The first "1" signal thusly produced at the output of AND-gate 99 is applied to the counting input of tolerance-range counter 85, and initiates counting by the latter. Thus, tolerance-range counter 85 receives its first input pulse during one of the second operating cycles of counter 43, i.e., during a cycle in which the transmission path from second photodiode 10 is rendered conductive, and thereafter each subsequent input pulse, likewise, during each successive second (alternate) operating cycle of counter 43. Until counter 85 reaches predetermined count, a "0" signal continues to be present at its output Qn, and accordingly a "1" signal continues to be applied from the output of inverter 100 to the lower input of AND-gate 99 (so that counting by tolerance-range counter 85 can continue) and to the lower inputs of the two AND-gates 74, 95 (so that signals produced at the outputs of the two voltage comparators 69-72, 89-92 can continue to be transmitted to the circuit stages connected to their outputs).

As already explained, if the camera's state of focus is perfect, then nominally the reflected-back infrared beam will be incident on the two photodiodes 9, 10 exactly equally. If the state of focus is greatly off, the reflected-back beam will be incident exclusively on one or the other of the photodiodes 9, 10, depending upon the sense of the state-of-focus error. If the state of focus is off but not greatly off, a greater part of the reflected-back beam will be incident on one photodiode 9, 10 than on the other, which one depending, again, on the sense of the state-of-focus error.

For explanatory purposes, assume that the state of focus is slightly in error, but to so small an extent that corrective action is not warranted, and with the sense of the error such that the reflected-back infrared beam is to a greater extent incident on photodiode 9 than on photodiode 10, although incident on both.

The appearance of a "1" signal at the output of first integrator 69–72, attributable to the incidence of the reflected-back beam on first photodiode 9, has already been mentioned. As also stated already, this has required a number of integrations performed by first integrator 69–72 determined by the fraction of the reflected-back beam incident on associated photodiode 9, and tolerance-range counter 85, as already stated, has commenced counting after the appearance of this voltage-comparator output signal, and is presently in the process of counting.

Meanwhile, because a fraction of the reflected-back beam is incident on second photodiode 10 also, and the light-dependent integral signal at the output of second integrator 86–88 has meanwhile been undergoing a similar stepwise build-up, more slowly building up to the threshold voltage level of second voltage comparator 89–92, due to the lesser fraction of the reflected-back beam incident on second photodiode 10. In such a situation, the integral signal at the output of second integrator 96–88 would, ultimately, reach the threshold level of second voltage comparator 89–92, i.e., after the tripping of first voltage comparator 69–72 by a time interval whose duration is determined by the amount of the small state-of-focus error. This occurs, and a "1" signal appears at the output of second voltage comparator 89–92.

For explanatory purposes, it is assumed that the amount of the state-of-focus error is not merely smaller than would warrant corrective action, but just slightly smaller than a value which would warrant corrective action. Subsequent to the appearance of a "1" signal at the output of first voltage comparator 69–72, and during the continued build up of the integral signal at the output of second integrator 86–88 towards the threshold level of second comparator 89–92, counting by tolerance-range counter 85 has been continuing. Just slightly after the appearance of a "1" signal at the output of second comparator 89–92, tolerance-range counter 85 reaches the count at which a "1" signal appears at its output Qn. As a result, a "0" signal appears at the output of inverter 100, thereby disabling AND-gate 100 and terminating further counting by counter 100, and furthermore disabling both AND-gates 74, 95, to prevent further transmission of output "1" signals from the first and second voltage comparators 69–72, 89–92 to their respective D-flip-flops 75, 96. Because the amount of the state-of-focus error is assumed to be just slightly below a value warranting corrective action, the "1" signal produced at the output of second voltage comparator 89–92 will have been transmitted to the clock input of associated D-flip-flop 96, causing a "1" signal to appear at the Q-output of the latter, just previous to the disablement of the two AND-gates 75, 96. Accordingly, in this situation, subsequent to the disablement of the two AND-gates 75, 96, the Q-outputs of both flip-flops 75, 96 are carrying "1" signals, just as if the reflected-back infrared beam had been incident on the two photodiodes 9, 10 to perfectly equal extents.

(If the state-of-focus error had been of the same sense, but of an amount just slightly greater than the value which begins to warrant corrective action, then the "1" signal produced at the output of second voltage comparator 89–92 would have appeared just slightly after the two AND-gates 74, 95 were disabled, with the result that, after disablement of these two gates, only flip-flop 75 would have a "1" signal at its Q-output.

Accordingly, the duration of the counting cycle of tolerance-range counter 85 serves to define the amount of state-of-focus error below which corrective action is not, and above which corrective action is, to be permitted. This serves to prevent hunting, and/or to take into account the fact that, as a practical matter, the two processed signals derived from the two photodiodes 9, 10 may not be perfectly equal even when the camera's state-of-focus happens to be exactly perfect).

The state-of-focus data needed for system operation has now been produced, and is held by the two D-flip-flops 75, 96.

Thereafter, a "1" signal appears at output Qm of cycle counter 83. This "1" signal is applied, without delay, to the clock inputs of D-flip flops 84 and 97, as a result of which these two flip-flops assume the states of respective ones of the two D-flip-flops 75 and 96. Shortly thereafter, the "1" signal produced at output Qm of cycle counter 83, i.e., delayed by an interval associated with the intermediate point (output of gate 76) of time-delay chain 76–81, is applied to the reset inputs R of the two D-flip-flops 75, 76, resetting these two flip-flops (i.e., causing a "0" signal to appear at their Q-outputs), to ready these two flip-flops for the next time the required state-of-focus data is to be established. Additionally, this delayed version of the "1" signal produced at output Qm of cycle counter 83 is applied to the bases of the two transistors 73, 93, rendering these conductive, thereby discharging the integrating capacitors 67, 87, and thus resetting the first and second integrators 66–68, 86–88. The same signal is applied to the reset input R of tolerance-range counter 85, resetting the latter; counting by counter 85 has already terminated, due to the "0" signal at the output of inverter 100, and counting by counter 85 does not now resume, despite the appearance of a "1" signal at the output of inverter 100, because of the presence of "0" signals at both inputs of OR-gate 98, keeping AND-gate 99 disabled.

In the exemplary situation here assumed, because "1" signals are present at the Q-outputs of both flip-flops 84, 97, neither of the two AND-gates 101, 106 produces an output "1" signal. Accordingly, neither of the two transistors 103, 109 is rendered conductive, and neither of the two LED's 104, 110 is illuminated. This indicates to the user that the camera's state of focus is within acceptable limits, and that he need not manipulate the camera's focus adjuster ring.

If the fraction of the reflected-back beam incident on photodiode 9 exceeds that incident on photodiode 10, by more than the tolerance-range amount established by tolerance-range counter 85, then a "1" signal is present at the Q-output of flip-flop 84 and at the $\bar{Q}$-output of flip-flop 97. Accordingly, a "0" signal is produced at the output of AND-gate 106 but a "1" signal at the output of AND-gate 101, as a result of which only transistor 103 is rendered conductive, and only LED 104 lights up, indicating to the user that he should turn the camera's focus adjuster ring in the direction of shorter subject-distance settings.

If the camera's present subject-distance setting is lower than the true camera-to-subject distance, by an amount greater than that corresponding to the tolerance range established by counter 85, a "1" signal is produced at the $\bar{Q}$-output of flip-flop 84 and is applied to the upper input of AND-gate 106. If the present subject-distance setting is not yet the maximum (infinity) subject-distance setting, switch 107 is open, and a "1" signal is applied to the lower input of AND-gate 106 as well, producing an output "1" signal which renders transistor 110 conductive and causes LED 110 to be illuminated, indicating to the user that he should turn the camera's focus adjuster ring in the direction of longer subject-distance settings. If the true camera-to-subject distance is so great that, even after the user now turns the adjuster ring all the way to infinity setting, a "1" signal still does not appear at the Q-output of flip-flop 84, switch 107 closes, applying a "0" signal to the lower input of AND-gate 106, thereby causing LED 110 to go dark in that way, i.e., to simulate a condition of system equilibrium so that the user will not be confused and/or attempt to turn the adjuster ring beyond its end setting. (If the two AND-gates 101, 106 do not merely drive such a LED indicator system, but instead control the direction of energization of an automatic focussing motor, then the closing of switch 107 when the infinity subject-distance setting is reached serves to prevent wasteful continuation of motor energization in contexts where the focussing system has still not reached an actual equilibrium condition.)

The cycle counter 83 determines how often a generation of focus-control data is to be performed, and how often the focus-control data held on the outputs of flip-flops 84, 97 and AND-gates 101, 106 is to be updated. The counting input of cycle counter 83 is connected, via terminal E and through the intermediary of adjustable time-delay stage 48–50, to the output of AND-gate 51, and accordingly counts the selfsame pulses actually effecting energization of infrared-emissive transmitter diode 57, but receives these pulses delayed by the same interval as involved in the activation of alternate switching stages in second multiplexer 39, i.e., due to the fact that the output of time-delay stage 48–50 is connected to the right inputs of the AND-gates 46, 47 which control the changes of state of the switching stages 40, 41 within second multiplexer 39. The duration of the complete counting cycle of cycle counter 83, resulting in the ultimate appearance of a "1" signal at the output Qm of cycle counter 83, is long enough to assure that at least one of the two voltage comparators 69–72, 89–92 is tripped, if the true camera-to-subject distance is within the operative range of the focussing system. At the end of the counting cycle of cycle counter 83, and after termination of the "1" signal at its output Qm, the integrations begin anew, in order to generate new or updated focus-control data.

In the illuminated embodiment, the power of the electrical signals produced by the photodetector arrangement 9, 10 is automatically regulated by negative-feedback action, and tends to remain relatively constant, at least for short camera-to-subject distances, due to automatic control of the level of radiant power emitted from transmitter diode 57. As a result, when the camera's state of focus error (whether or not actually acceptable) is low enough that the reflected-back beam is partly incident on each of the two photodiodes 9, 10, the time interval elapsing between the tripping of one of the two voltage comparators 69–72, 89–92 and the tripping of the other is rather directly correlatable with the true magnitude of the state-of-focus error. Accordingly, the maximum acceptable value for the amount of the focus error can, as shown, be implemented using a tolerance-range counter 85 whose counting cycle is of fixed duration.

However, if the power level of the received-back radiation is not thusly subjected to negative-feedback regulation, the time elapsing between tripping of one of the two voltage comparators 69–72, 89–92 and the tripping of the other ceases to be so directly correlatable with the true magnitude of the focus error, because it becomes highly dependent upon the magnitude of the true camera-to-subject distance per se, i.e., irrespective of whether the focus error per se is zero or considerably higher. This tends to reduce the definiteness of the tolerance range established by a tolerance-range counter of fixed counting-cycle duration. In that event, the counting-cycle duration of the tolerance-range counter can be made inversely related to the power level of the signal developed by the photodetector arrangement 9, 10. For example, instead of developing a signal inversely related to the output signal of amplifier 36 and using it to control the emitted-power level, such a signal can be developed, applied to an analog-to-digital converter, and in digital form be applied to a tolerance-range counter to establish the count which the tolerance-range counter must reach before a "1" signal appears on its Qn output.

It will be understood that each of the elements described above, or two or more together, may also find a useful application in other types of focussing systems differing from the types described above.

While the invention has been illustrated and described as embodied in a focussing system employing infrared radiation and in which the output signals of two photodiodes are time-division-multiplexed in their transmission through shared signal-processing circuitry, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A focusing system for use in cameras and the like, comprising a clocked radiation transmitter transmitting a single beam of radiation pulses towards a photographic subject; a radiation detector detecting such radiation pulses after their reflection from the subject and producing a pulsed received signal in response thereto; an integrator integrating the received signal and generating an integral signal which is an integral thereof; a first means connected to the integrator and operating in such a manner as to derive focus-control information from the integral signal, whereby camera focus can be adjusted to correspond with distance between the camera and the subject; and a transmission means and a transmission means control connected thereto, the transmission means being interposed between the radiation detector and passing and blocking received signals generated by the radiation detector and from the integrator in accordance with commands issued by the transmission means control, whereby received signals are blocked from transmission to the integrator except during intervals which are substantially concurrent with detection of radiation pulses by the radiation detector, said first means being responsive to the intergral signal only after the integrator has integrated a plurality of pulses in the received signal and the integrator continuing to integrate the received signal until the integral signal reaches a predetermined value, at which time said plurality is counted, whereby focus-control information can be derived from the plurality of pulses which are so counted.

2. The focusing system defined by claim 1, wherein focus-control information is further derived from a failure of the integral signal to reach said predetermined value after a predetermined number of pulses have been so integrated.

3. The focusing system defined by claim 1, further including an integrator reset circuit for resetting the integrator and thereby allowing integrations to take place successively, wherein the first means stores focus-control information while a successive integration takes place.

4. The focusing system defined by claim 1, wherein the system includes a signal processor interposed between the radiation detector and the integrator and processing the received signal prior to integration thereof in the integrator.

5. A focusing system for use in cameras and the like, comprising a clocked radiation transmitter transmitting a single beam of radiation pulses towards a photographic subject; like first and second radiation detectors detecting such radiation pulses after their reflection from the subject and producing a pulsed received signal in response thereto; like first and second integrators each connected to a corresponding radiation detector and each producing a time-integral signal in response to the received signal produced thereby, each integrator integrating its received signal for a period of time, which period continues until the time-integral signal reaches a predetermined value and which therefore depends upon amplitude of the received signal being integrated; a threshold circuit receiving the time-integral signals and producing an output signal whenever said predetermined value is reached, the threshold circuit including two threshold detectors each being connected to a corresponding one of the first and second integrators and producing an output signal when its time-integral signal reaches said predetermined value; and a resetting circuit repeatedly resetting the first and second integrators, the first and second integrators each including an operational amplifier with a feedback capacitor, the resetting circuit including semiconductor discharge switches connected in circuit with the feedback capacitors, and the focusing system further including means for causing the discharge switches to discharge the feedback capacitors.

6. A focusing system for use in cameras and the like, comprising a clocked radiation transmitter transmitting a single beam of radiation pulses towards a photographic subject; like first and second radiation detectors detecting such radiation pulses after their reflection from the subject and producing a pulsed received signal in response thereto; like first and second integrators each connected to a corresponding radiation detector and each producing a time-integral signal in response to the received signal produced thereby, each integrator integrating its received signal for a period of time, which period continues until the time-integral signal reaches a predetermined value and which therefore depends upon amplitude of the received signal being integrated; a threshold circuit receiving the time-integral signals and producing an output signal whenever said predetermined value is reached, the threshold circuit including two threshold detectors, each threshold detector being connected to a corresponding one of the first and second integrators and producing an output signal when its time-integral signal reaches said predetermined value; a resetting circuit repeatedly resetting the first and second integrators; and a timer timing an interval between production of an output signal by one threshold detector and production of another output signal by another threshold detector, the timer determining whether the interval so timed exceeds a predetermined interval of time.

7. The focusing system defined by claim 6, further including a memory for storing the output signals during resetting of the first and second integrators while the first and second integrators perform another integration.

8. The focusing system defined by claim 6, further including a transmission means interposed between each radiation detector and a corresponding integrator and transmitting a received signal thereto during intervals of time which are at least substantially concurrent with detection of radiation pulses received by the first and second radiation receivers.

9. The focusing system defined by claim 6, wherein the transmitter is driven by a clock.

10. The focusing system defined by claim 6, wherein the resetting circuit includes a counter.

11. The focusing system defined by claim 10, wherein the transmitter is driven by the clock and wherein the counter counts pulses generated by the clock.

12. The focusing system defined by claim 6, wherein the timer is clocked and counts clock pulses after production of an output signal, the timer producing a control signal after a predetermined number of clock pulses has been counted, and wherein the focusing system further includes a transmitting network connected to the threshold detectors for transmitting and blocking output signals in response to the control signal.

13. The focusing system defined by claim 12, further including a power control varying radiant power of the beam by negative feedback of pulse amplitude, whereby radiation pulses incident upon the radiation detectors are stabilized in power while pulse frequency remains invarient.

14. The focusing system defined by claim 13, wherein the power control limits radiant power of the beam at short subject-detector distances to prevent overloading the radiation detectors.

15. The focusing system defined by claim 12, further including a means automatically varying a number of clock pulses counted by the timer inversely to variation of power of the received signals, whereby the control signal is also so varied.

16. The focusing system defined by claim 6, further including a multiplexer having a first input connected to the first radiation detector and a second input connected to the second radiation detector, further including a shared signal-processing circuit connected to the multiplexer and processing signals multiplexed therein, further including a demultiplexer with a first output connected to the first integrator and a second output connected to the second integrator, the demultiplexer demultiplexing signals processed in the signal-processor, further including a driver synchronizing the multiplexer and the demultiplexer so that received signals from the first radiation detector are processed in the signal processor and routed to the first integrator and received signals from the second radiation detector are processed in the signal processor and routed to the second integrator, further including a tolerance-range counter which counts that number of times a predetermined one of the first and second received signals is processed in the signal processer in response to production of an output signal by either one of the first and second threshold detectors, further including signal-transmission means connected to the outputs of the threshold circuits and finally including means for disabling the signal-transmission means when the tolerance-range counter reaches a predetermined count.

17. A focusing system for use in cameras and the like, comprising a clocked radiation transmitter transmitting a single beam of radiation pulses towards a photographic subject; like first and second radiation detectors detecting such radiation pulses after their reflection from the subject and producing a pulsed received signal in response thereto; like first and second integrators each connected to a corresponding radiation detector and each producing a time-integral signal in response to the received signal produced thereby, each integrator integrating its received signal for a period of time, which period continues until the time-integral signal reaches a predetermined value and which therefore depends upon amplitude of the received signal being integrated, the first and second integrators each including an operational amplifier and a feedback capacitor connected thereto; a resetting circuit repeatedly resetting the first and second integrattors; a threshold circuit receiving the time-integral signals and producing an output signal whenever said predetermined value is reached, the threshold circuit including two threshold detectors, each threshold detector being connected to a corresponding one of the first and second integrators and producing an output signal when its time-integral signal reaches said predetermined value; a pair of first flipflops each connected to an output of a respective one of the threshold detectors and storing output signals produced thereby; means for erasing signals stored in the first flipflops; a pair of second flipflops connected each to an output of a corresponding one of the first flipflops for further storing output signals after such signals have been erased from the first flipflops; and an output circuit responsive only to signals stored in the second flipflops, all the flipflops being D-type flipflops and having clock inputs, D inputs and Q outputs, the second flipflops having Q outputs, the clock inputs of the first slipflops each being connected to a corresponding one of the threshold detectors, the Q output of each first flipflop being connected to the D input of a corresponding one of the second flipflops, and the focusing system further including a timing means periodically clocking the clock inputs of the second flipflops.

18. The focusing system defined by claim 17, wherein the output circuit includes a display which indicates to a user a direction in which a camera objective is to be adjusted in order to focus the camera.

19. The focusing system defined by claim 17, furthermore including a frist gate having an output and inputs, which inputs are connected to the Q outputs of the first flipflops, a second gate having an output, a first input, a second input, and a third input, the first input being connected to the output of the first gate, a tolerance-range counter having a counting input connected to the output of the second gate and having an output which is connected to the second input of the second gate for disabling the second gate when the tolerance-range counter reaches a predetermined count, and further including means for clocking the transmitter corresponding to the radiation pulses transmitted by the transmitter to the third input of the second gate.

* * * * *